US012678871B2

(12) United States Patent (10) Patent No.: US 12,678,871 B2
Bock et al. (45) Date of Patent: Jul. 14, 2026

(54) BAND-SAW BLADE CHANGING DEVICE AND METHOD

(71) Applicant: GEBRÜDER LINCK MASCHINENFABRIK "GATTERLINCK" GMBH & CO. KG, Oberkirch (DE)

(72) Inventors: Martin Bock, Buch am Buchrain (DE); Reinhard Sigl, Perach (DE)

(73) Assignee: GEBRÜDER LINCK MASCHINENFABRIK "GATTERLINCK" GMBH & CO. KG, Oberkirch (DE)

( * ) Notice: Subject to any disclaimer, the term of this patent is extended or adjusted under 35 U.S.C. 154(b) by 407 days.

(21) Appl. No.: 18/324,546

(22) Filed: May 26, 2023

(65) Prior Publication Data

US 2023/0294186 A1 Sep. 21, 2023

Related U.S. Application Data

(63) Continuation of application No. PCT/EP2021/082710, filed on Nov. 23, 2021.

(30) Foreign Application Priority Data

Nov. 27, 2020 (DE) ..................... 10 2020 131 540.6

(51) Int. Cl.
*B23D 53/00* (2006.01)
*B23D 55/00* (2006.01)
(Continued)

(52) U.S. Cl.
CPC ............. *B23D 59/00* (2013.01); *B23D 55/00* (2013.01); *B27B 13/16* (2013.01)

(58) Field of Classification Search
CPC ...... B23D 53/005; B23D 59/00; B23D 55/00; B23D 55/082; B23D 55/065; B23D 55/084; B27B 13/00; B27B 13/16; B66C 1/06
(Continued)

(56) References Cited

U.S. PATENT DOCUMENTS 4,535,666 A 8/1985 Fiori et al.
5,365,812 A * 11/1994 Harnden .............. B23D 47/042
83/486.1
(Continued)

FOREIGN PATENT DOCUMENTS

CN 209455972 U * 10/2019
CN 111482654 A * 8/2020 ............... B23Q 7/05
(Continued)

OTHER PUBLICATIONS

International Search Report and Written Opinion dated Feb. 18, 2022 from related International Patent Application No. PCT/EP/2021/082710.

*Primary Examiner* — Ghassem Alie
(74) *Attorney, Agent, or Firm* — SHUTTLEWORTH & INGERSOLL, PLC; Jason R. Sytsma

(57) ABSTRACT

A device for mounting and dismounting a band-saw blade has a movable support frame and a plurality of retaining elements distributed on said support frame and configured to temporarily adhere to the outer flat side of the band-saw blade at various locations along the contour of the band-saw blade, thereby exerting an outwardly directed force on the outer flat side of the band-saw blade.

18 Claims, 4 Drawing Sheets

(51) Int. Cl.
    *B23D 59/00*        (2006.01)
    *B27B 13/16*        (2006.01)
(58) Field of Classification Search
    USPC ................... 83/13, 795, 916, 820, 800, 466
    See application file for complete search history.

(56)                       References Cited

U.S. PATENT DOCUMENTS

| | | | | |
|---|---|---|---|---|
| 8,365,643 | B2 * | 2/2013 | Aihara ................. | B23D 55/005 |
| | | | | 83/788 |
| 2002/0144582 | A1 * | 10/2002 | He ....................... | B23D 45/048 |
| | | | | 83/487 |

FOREIGN PATENT DOCUMENTS

| | | | | |
|---|---|---|---|---|
| JP | H01199718 | A | 8/1989 | |
| JP | H04105817 | A | 4/1992 | |
| JP | H06143026 | A1 | 5/1994 | |
| JP | H06226527 | A | 8/1994 | |
| JP | 2810163 | B2 * | 10/1998 | ........... B23D 53/005 |
| JP | 2005262352 | A * | 9/2005 | ........... B23D 53/005 |
| JP | 2017144496 | A1 | 8/2017 | |
| TW | I624322 | B | 5/2018 | |
| WO | 2009101760 | A1 | 8/2009 | |

\* cited by examiner

BAND-SAW BLADE CHANGING DEVICE AND METHOD

CROSS REFERENCES TO RELATED APPLICATIONS

This application is a continuation of international patent application PCT/EP2021/082710 filed on Nov. 23, 2021 designating the U.S., which international patent application claims priority from German patent application 10 2020 131 540.6 filed on Nov. 27, 2020. The entire contents of these priority applications are incorporated herein by reference.

BACKGROUND

The present invention relates to a device for mounting or dismounting a band-saw blade of a band-saw. In other words, the present invention relates to a band-saw blade changing device and method Band-saws are saws having a saw blade that forms a closed contour or ring. Such a saw blade, which is typically referred to as a band-saw blade, is usually supported and guided by two band-saw rollers and runs around them. The two rollers are spaced apart and rotate about respective axes of rotation, which are mostly parallel to each other. At least one of the two rollers is motor-driven and thus moves the band-saw blade at an adjustable speed. Thus, an endless uninterrupted cutting is possible. The band-saw blade is therefore often also referred to as an endless saw blade.

When mounted, the band-saw blade mounted on the two band-saw rollers has a substantially oval contour with two opposing straight sections extending between the two band-saw rollers and two opposing arcuate sections disposed between the two straight sections and abutting the band-saw rollers.

Similar to saw blades of other types of saws, band-saw blades need to be regularly replaced, e.g. when they are worn or damaged. This replacement process is traditionally carried out manually, i.e. by hand. Due to the size and relatively high weight of such band-saw blades, two to three persons are usually required for such a change operation. These persons must not only be strong, but also very skilled, since correct mounting and dismounting of a band-saw blade requires some skill.

Experienced operators of band-saws sometimes also make use of rudimentary suspensions on an overhead crane to support the changing process of the band-saw blade. Ultimately, however, even in this case at least two people are needed to precisely mount the band-saw blade on the two band-saw rollers or to remove it from them.

Whether with or without the aid of additional suspensions, the conventional process of changing a band-saw blade thus requires a relatively high level of manpower. Manual handling also involves the risk of damaging the saw teeth of the band-saw blade or other components of the band-saw. Furthermore, there is a relatively high risk of injury for the persons carrying out the changing process.

Automation or at least partial automation of the blade changing process is therefore desirable.

JPH06 226527 A discloses a device for automated changing of a band-saw blade. This device has, among other things, several gripping elements which grip the band-saw blade in the area of its two straight sections between the band-saw rollers and press it apart in order to be able to dismount the band-saw blade from the band-saw rollers. Mounting of the band-saw blade is done in the reverse manner using the same grippers.

Although this type of device appears to be advantageous compared to manual handling of the changeover process, several disadvantages can be identified with this solution.

Gripping the band-saw blade with the aid of said grippers can cause damage, especially to the saw teeth. Due to the way the grippers are designed, the band-saw blade can only be pressed apart in the area of its two straight sections, i.e. in the area between the two band-saw rollers. It is therefore not possible to completely rule out the possibility of the band-saw blade becoming caught or jammed with one of the two band-saw rollers, so that problems can also arise during the mounting or dismounting of the band-saw blade.

SUMMARY

In view of this background, it is an object of the present invention to provide a device for mounting or dismounting a band-saw blade. In particular, it is an object to provide a band-saw blade changing device that facilitates an automated replacement of a band-saw blade on a band saw.

It is another object to provide a band-saw blade changing device and method that facilitate an easier replacement of a band-saw blade on a band saw.

It is yet another object to provide a band-saw blade changing device and method that help to avoid damage of the band-saw blade during a replacement process.

In accordance with one aspect, there is provided a device for at least one of mounting and dismounting a band-saw blade onto or from a band-saw, the band-saw blade having, when mounted on the band-saw, a closed contour and comprises two opposing narrow sides, at least one of which is provided with a plurality of saw teeth or a cutting material, and comprises two opposing flat sides interconnecting the narrow sides, one of the two opposing flat sides is an outwardly facing outer flat side and the other one is an inwardly facing inner flat side, the device comprising:

a support frame;

a support structure configured to support and move the support frame along at least two axes aligned transversely to each other; and a plurality of retaining elements distributed on the support frame and configured to selectively attach to the outer flat side of the band-saw blade at various locations along the closed contour of the band-saw blade, thereby exerting an outwardly directed retaining force on the outer flat side of the band-saw blade;

wherein the support frame is suspended from the support structure;

wherein the support structure comprises a cantilever beam extendable along one of the axes; and wherein the support structure is configured to rotate the support frame about one of the axes.

In accordance with another aspect, there is provided a device for mounting or dismounting a band-saw blade which, when mounted on a band-saw, has a closed contour and comprises two opposing narrow sides, at least one of which is provided with a plurality of saw teeth or a cutting material, and comprises two opposing flat sides interconnecting the narrow sides, one of the two opposing flat sides being an outwardly facing outer flat side and the other one being an inwardly facing inner flat side, the device comprising a movable support frame, and comprising a plurality of retaining elements distributed on the support frame and configured to temporarily adhere to the outer flat side of the band-saw blade at various locations along the closed contour of the band-saw blade, thereby exerting an outwardly directed retaining force on the outer flat side of the band-saw blade.

In accordance with another aspect, there is provided a method of at least one of mounting and dismounting a band-saw blade onto a band-saw or from a band-saw, the band-saw blade having a closed contour when mounted on the band-saw and comprising two opposing narrow sides, at least one of which is provided with a plurality of saw teeth or a cutting material, and two opposing flat sides interconnecting the narrow sides, one of the opposing flat sides being an outwardly facing outer flat side and the other one being an inwardly facing inner flat side, the method comprising the steps of:

providing a movable support frame having a plurality of retaining elements distributed on the support frame;

moving the support frame toward the band-saw blade to be mounted or dismounted, which band-saw blade is located at a first location;

activating the plurality of retaining elements to temporarily attach the retaining elements to the outer flat side of the band-saw blade at various locations along the closed contour of the band-saw blade, thereby exerting an outwardly directed retaining force on the outer flat side of the band-saw blade;

moving the support frame, together with the band-saw blade temporarily attached thereto, from the first location to a second location;

deactivating the plurality of retaining elements to release the band-saw blade from the support frame and leave the band-saw blade in the second location;

wherein, when the band-saw blade is mounted, the first location is a storage location for the band-saw blade and the second location is a band-saw, and wherein, when the band-saw blade is dismounted, the first location is the band-saw and the second location is the storage location for the band-saw blade.

Unlike the device disclosed in JPH06 226527 A, the band-saw blade in the new device is not gripped laterally by grippers, but is pulled outward by a plurality of retaining elements at various points along the circumference of the band-saw blade. The retaining elements used for this purpose adhere to the outer flat side of the band-saw blade, preferably over a large area, and exert an outwardly directed tensile force on the band-saw blade. This temporary "adhesion" to the band-saw blade can be achieved, for example, by means of negative pressure, magnetically or by a temporary adhesive bond.

The adhesion of the plurality of retaining elements and the outward pulling of the band-saw blade caused by the retaining elements can be used both for mounting and dismounting the band-saw blade.

During the mounting process, the device is first moved to the band-saw blade to be mounted, which band-saw blade is located at a storage location, for example, and is suspended on a blade stand for storage. The support frame with the plurality of retaining elements is moved into a position such that the retaining elements can attach to the band-saw blade when activated. Subsequently, the retaining elements are activated, causing the outer flat side of the band-saw blade to adhere to the retaining elements and pulling the band-saw blade outward. The band-saw blade adhering to the support frame and the retaining elements, respectively, is then moved from the storage location to the band-saw and placed on the two band-saw rollers of the band-saw. Once this is done, the retaining elements are deactivated. The band-saw blade is thus automatically released from the support frame, the stretching of the band-saw blade gives way and the band-saw blade is positioned on the band-saw rollers. Subsequently, if necessary, some minor adjustments can be made.

The dismounting process goes in a corresponding reverse order. Here, the device is first positioned on the band-saw blade mounted on the band-saw. Then the retaining elements are activated, which pulls the band-saw blade outward and allows it to be removed from the band-saw rollers. The band-saw blade adhering to the support frame or the retaining elements, respectively, is then moved to a storage location and released from the support frame by deactivating the retaining elements so that it can remain at the storage location, for example on a wall stud.

The use of the plurality of retaining elements in the new device or method results in particular in the following advantages: Since the band-saw blade is not gripped laterally, damage to the saw teeth or the cutting material can be avoided. The mounting and dismounting process is thus very gentle on the band-saw blade. The use of the plurality of retaining elements adhering to the outer flat side of the band-saw blade is furthermore rather space-saving. The new device can therefore be used for band-saws with very restricted installation conditions. Due to the relatively small space required for retaining elements and the fact that the retaining elements are brought up to the band-saw blade from the outside, the retaining elements can also be positioned in the region of the arcuate sections of the band-saw blade which are in contact with the band-saw rollers. Unlike grippers, which only press the band-saw blade apart in the area between the two band-saw rollers, the band-saw blade can thus be stretched very homogeneously along its entire length with the device according to the invention, and thus very easily removed from the band-saw rollers or positioned on them.

According to a preferred refinement, the retaining elements each are configured to adhere exclusively to the outer flat side of the saw blade.

This has the particular advantage that no components of the new device have to engage the inner flat side in order to stretch the band-saw blade for the mounting or dismounting process. In the area of the band-saw rollers, this is particularly advantageous, since it is difficult to insert grippers or other components into the space between the arcuate sections of the band-saw blade and the band-saw rollers. However, due to the exclusive adhesion of the retaining elements to the outer flat side of the band-saw blade, this is not necessary, so that the band-saw blade can also be held in the area of the band-saw rollers, i.e. in the area of the arcuate sections of the band-saw blade, with the aid of the retaining elements.

According to a further refinement, the retaining elements each comprise at least one of a vacuum lifter, a suction cup, a permanent magnet, an electromagnet, and/or a temporarily sticking retaining element.

The use of vacuum lifters as holding elements is particularly preferred. Such vacuum lifters are also referred to as suction lifters, suction pads or vacuum cups. They are particularly suitable for gripping smooth surfaces, such as those typically found on the outer flat side of band-saw blades. "Gripping" takes place by means of a vacuum applied to the surface, which is generated between the vacuum lifter and the outer flat side of the band-saw blade.

The use of magnets is also conceivable, but less advantageous compared to vacuum lifters, since interference from various metal components can occur in the environment of band-saws.

The use of temporarily sticking bonding elements is also conceivable. This refers in particular to coatings whose adhesive properties can be activated and deactivated, for example, by the effect of temperature or magnetic and/or electric fields.

According to a further refinement, the support frame of the new device has two opposing straight sections and at least one arcuate section connecting the two straight sections, wherein at least one retaining element of the plurality of retaining elements is arranged in each of the two straight sections and in the arcuate section.

In this way, the tensile force caused by the retaining elements can be applied not only in the two straight sections of the band-saw blade arranged between the band-saw rollers, but also in at least one arc-shaped section of the band-saw blade (in the area of the band-saw rollers).

It is also possible for the support frame to have a further arcuate section opposite the first arcuate section, wherein at least one retaining element of the plurality of retaining elements can also be arranged in this further arcuate section. In this case, the retaining elements could be attached to the band-saw blade along its entire circumference.

However, a preferred refinement is one in which only one of the two arcuate sections of the support frame is provided with retaining elements, but the other arcuate section of the support frame is free of retaining elements. As far as the retaining elements are concerned, the support frame in this case is open on one side, so to speak. The support frame can thus be more easily slipped over the band-saw blade and attached to it. It is true that the retaining elements are then only arranged in the area of one band-saw roller and in the straight sections of the band-saw blade. However, this is sufficient in the vast majority of cases, since the two band-saw rollers are typically moved towards each other during the mounting or dismounting of a band-saw blade in order to reduce their distance from each other and release the tension on the band-saw blade.

According to a further refinement, the new device further comprises a support structure configured to support the support frame and to move along at least two transversely aligned axes.

These axes are preferably linear axes. Such solidly designed linear axes are particularly advantageous compared to the use of an overhead crane for moving the support frame, since inertia-induced oscillation can then be largely avoided. The positioning of the support frame and thus of the retaining elements relative to the band-saw blade to be mounted or dismounted can thus be carried out much more accurately.

The term "transverse" is used here to refer to any type of alignment that is not parallel. Transverse therefore includes orthogonal, but is not limited to a right angle.

Particularly preferably, the support structure is configured to move the support frame along three axes aligned orthogonally to one another. Preferably, at least one of these three axes is a rail guide. The support frame can then be moved very precisely to almost any position in three-dimensional space.

According to a further refinement, the support structure comprises a cantilever beam which is extendable along one of the axes. The extendable axis is preferably the feed axis of the device according to the invention, along which the support frame is moved towards or away from the band-saw blade parallel to the axes of the band-saw rollers during mounting or dismounting.

According to a further refinement, the support structure is configured to rotate the support frame about one of the three axes. Preferably, this axis is the aforementioned axis along which the cantilever beam of the support structure can be extended.

A rotatable design of the support structure has in particular the advantage that the support frame can be swiveled to any angle in order to be aligned parallel to the band-saw blade mounted on the band-saw. In fact, the stand of the band-saw is often slightly inclined so that the axes of the two band-saw rollers are not exactly vertically one above the other, but are slightly offset horizontally with respect to each other. An exemplary inclination of the band-saw machine is between 10°-25° with respect to the vertical.

According to a further refinement, the support frame is suspended from the support structure. The band-saw blade can thus be moved very easily "floating" through a factory floor using the new device without colliding with objects on the floor.

It is understood that the above-mentioned features and those to be explained below can be used not only in the combination indicated in each case, but also in other combinations or in a stand-alone position, without leaving the scope of the present invention. Furthermore, it is understood that the previously mentioned design variants and the features defined in the dependent claims relating to the new device refer not only to the device according to the invention, but also to the new method in an equivalent manner.

BRIEF DESCRIPTION OF THE DRAWINGS

An exemplary embodiment of the invention is shown in the drawings and explained in more detail in the following description. It shows.

EMBODIMENTS

Figure 1:
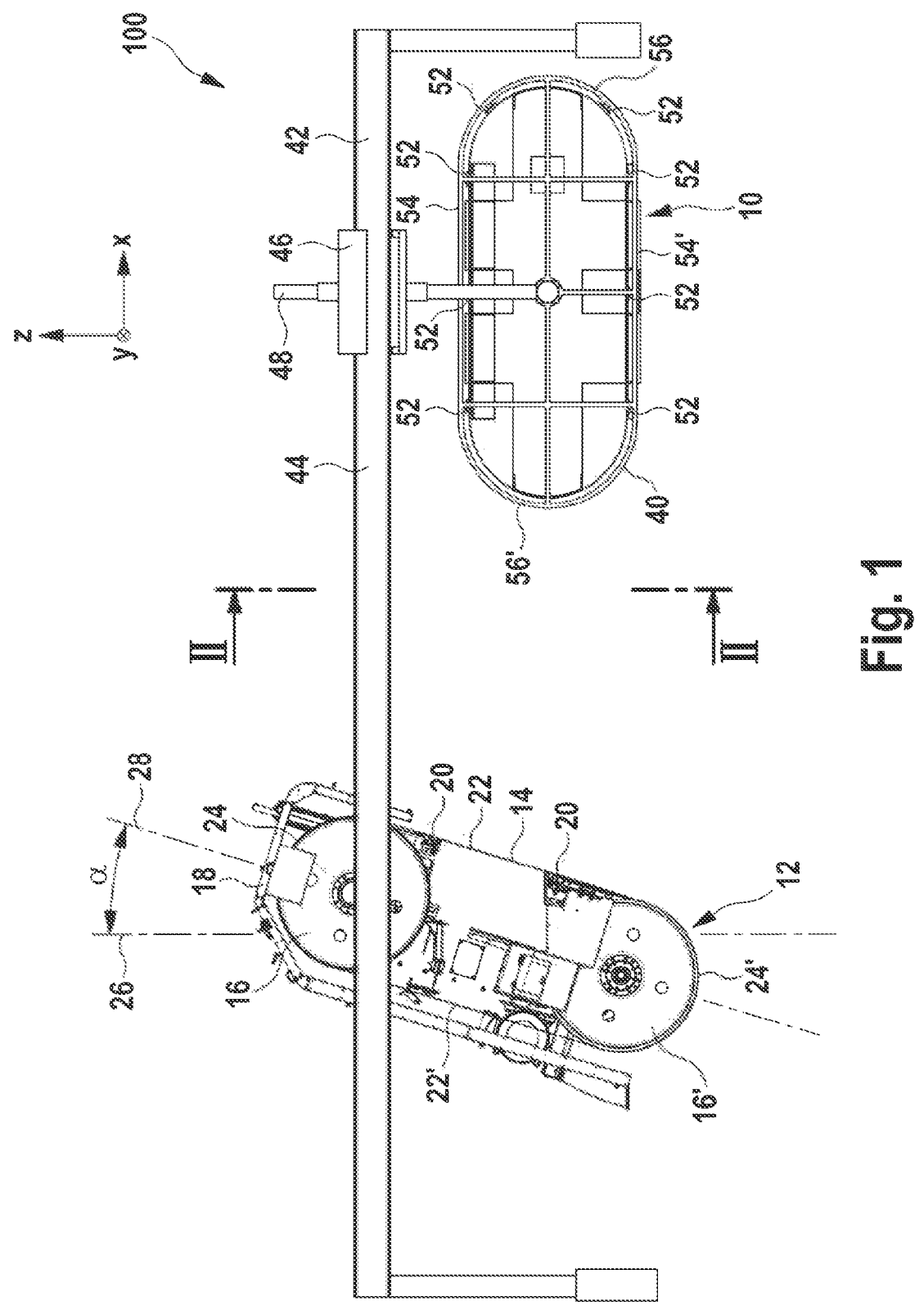
FIG. 1 a top view onto a band-saw blade changing device according to an exemplary embodiment of the present invention.

FIG. 1 shows an installation comprising a band-saw and a band-saw blade changing device according to an exemplary embodiment of the present invention. The installation is designated in its entirety by the reference numeral 100 in FIG. 1. The band-saw blade changing device is designated by reference numeral 10. The band-saw is designated by reference numeral 12.

For a better understanding, the individual components as well as the structure of the band-saw 12 will first be discussed in the following, before the components and the structure of the device 10 are explained in detail.

The band-saw 12 has a band-saw blade 14 which is configured to form a closed, oval loop. This band-saw blade 14 is mounted on two band-saw rollers 16, 16', at least one of which is rotationally driven during operation of the band-saw 12. The band-saw blade 14 thus moves around the two band-saw rollers 16, 16' during operation of the band-saw 12, so that an endless cut can be produced with the aid of the band-saw 12. The band-saw blade 14 is therefore often also referred to as an endless saw blade.

Towards the rear as well as in the upper area of the band-saw 12, the band-saw blade 14 as well as the rollers 16, 16' are typically safeguarded by a cover 18. This cover 18 is also referred to as a roller guard. For guiding the saw blade 14, the band-saw 12 further comprises a plurality of guide elements 20. These prevent the saw blade 14 from leaving its predetermined path.

The contour of the band-saw blade 14 or its path, as mentioned above, is substantially oval with two opposing straight sections 22, 22' extending in the area between the two band-saw rollers 16, 16' and two opposing arcuate sections 24, 24' interconnecting the two straight sections 22, 22' of the band-saw blade 14 and corresponding to the areas of the band-saw blade 14 where it rests on the band-saw rollers 16, 16'.

In the exemplary embodiment shown in FIG. 1, the band-saw 12 is inclined with respect to the vertical line 26. This inclination is indicated in FIG. 1 by the angle α. The angle α indicates the angle that the longitudinal axis 28 of the band-saw 12 makes with the vertical 26. This longitudinal axis 28 of the band-saw 12 corresponds to an imaginary connecting line of the axes of the two band-saw rollers 16, 16'.

Figures 4, 5:
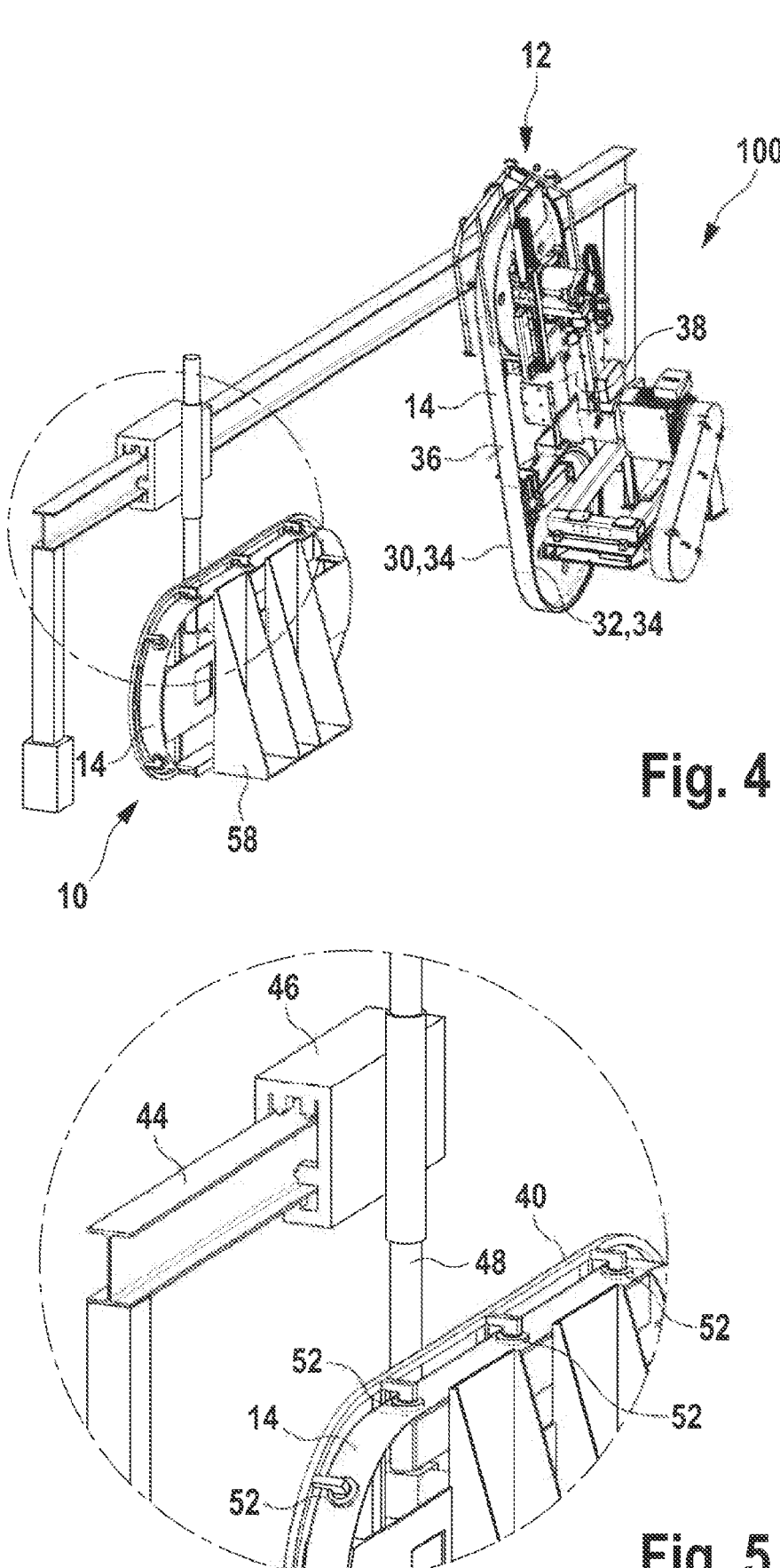
FIG. 4 a perspective view of the band-saw and band-saw blade changing device of FIG. 1.
FIG. 5 a detail from FIG. 4.

The shape and construction of the band-saw blade 14 are best seen in FIG. 4. The band-saw blade 14 has two opposing narrow sides 30, 32, at least one of which is provided with a plurality of saw teeth 34. In the present exemplary embodiment, both narrow sides 30, 32 have saw teeth 34. In the present case, therefore, it is a double-sided cutting band-saw blade 14. However, this need by no means necessarily be the case.

Between the two narrow sides extend the flat sides 36, 38 of the band-saw blade 14. These two flat sides 36, 38 are preferably designed parallel to each other and also form two opposite sides of the band-saw blade 14. As the name implies, these two flat sides 36, 38 are preferably designed as plane or flat sides of the band-saw blade 14. The outer flat side 36 runs along the outer periphery of the band-saw blade 14, thus forming its outer side. The inner flat side 38 runs along the inner circumference of the band-saw blade 14, forming its inner side. In other words, the outer flat side 36 of the band-saw blade 14 is the side of the band-saw blade 14 facing away from the band-saw rollers 16, 16'. The inner flat side 38, on the other hand, is the inner side of the band-saw blade 14 facing the band-saw rollers 16, 16'.

It is understood that the two flat sides 36, 38 of the band-saw blade 14 are typically wider than the two narrow sides 30, 32.

Figure 2:
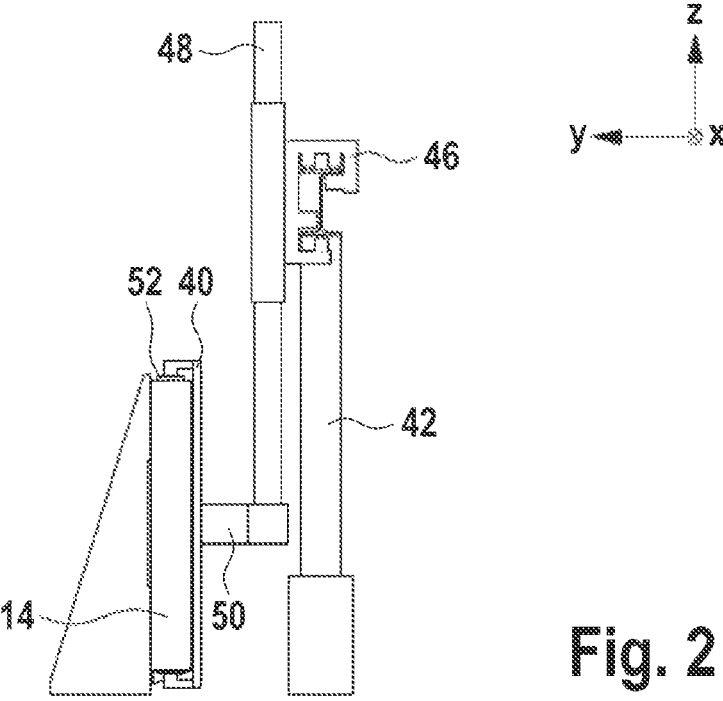
FIG. 2 a side view of the band-saw blade changing device of FIG. 1 in a first state.
Figure 3:
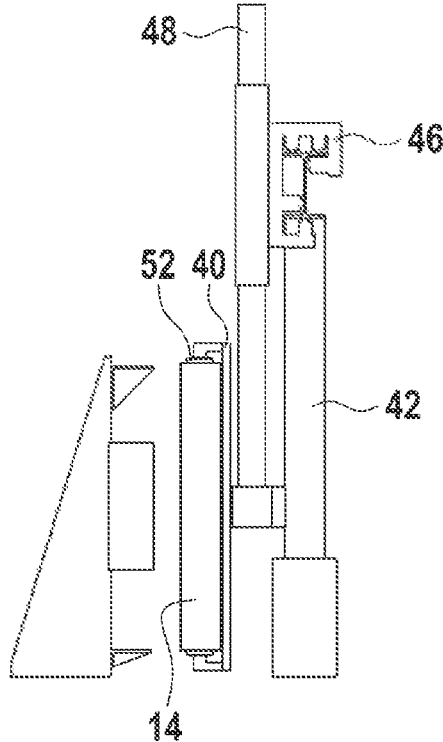
FIG. 3 a side view of the band-saw blade changing device of FIG. 1 in a second state.

In addition to the band-saw 12, FIGS. 1 and 4 further show the device 10 for automated mounting and dismounting the band-saw blade 14. The device 10 has a support frame 40, which in turn is suspended from a support structure 42 in the carrier structure embodiment shown here. The support structure 42 enables the support frame 40 to be moved along three axes, which are designated x, y and z in FIG. 1. For this purpose, the support structure 42 has a horizontal guide rail 44 extending along the x-axis, on which a carriage 46 is longitudinally displaceable. An arm 48 aligned in the z-direction is mounted on the carriage 46. This arm 48 is preferably an arm which can be moved along the z-axis and is used for positioning in the z-direction. A cantilever beam 50 is arranged at the lower end of this arm 48 (see FIGS. 2 and 3), which serves for positioning in the y-direction. The cantilever beam 50 is preferably designed as a movable or telescopically extendable cantilever beam.

The support frame 40 is mounted on the free end of the cantilever beam 50. The support frame 40 is thus almost freely movable in all three spatial directions x, y and z, so that it can be positioned relatively easily in relation to the band-saw 12.

Preferably, the support frame 40 can also be rotated about the y-axis. A corresponding actuator is preferably provided in the cantilever beam 50 for this purpose.

A plurality of retaining elements 52 are arranged on the support frame. These retaining elements 52 are preferably actively controllable actuators that are configured to temporarily adhere to the outer flat side 36 of the band-saw blade 14 at various points along its contour and thereby exert an outwardly directed tensile force on the outer flat side 38. For this purpose, the retaining elements 52 may each comprise a vacuum lifter, a magnet, or a temporarily sticking retaining element that can be activated in response to temperature, by way of example.

The retaining elements 52 are distributed on the support frame 40 (see, for example, FIG. 5). In the present exemplary embodiment shown, a total of eight such retaining elements 52 are arranged on the support frame 40. Three of the retaining elements 52 are arranged on each of the two opposing straight sections 54, 54'. Two further retaining elements 52 are arranged on one of the two arcuate sections 56 connecting the two straight sections 54, 54' (see FIG. 1). It is to be understood, however, that the total number of eight retaining elements 52 is to be understood merely as an example. Of course, more than eight retaining elements or even fewer than eight retaining elements 52 may be arranged on the support frame 40. Preferably, at least one retaining element 52 is arranged in each of the three aforementioned sections 54, 54', 56 of the support frame 40. This enables a reasonably uniform expansion of the band-saw blade 14 in almost all of its sections 22, 24.

In the exemplary embodiment example shown here, the support frame 40 is "open on one side". In this case, no retaining elements 52 are arranged on the second arcuate section 56'. This second arcuate section 56' of the support frame 40 is positioned in the region of the upper or lower band-saw roller 16, 16' during the mounting or dismounting process of the band-saw blade 14. In one of the two areas, retaining elements 52 are not necessarily required.

The operation of the band-saw blade changing device 10 and the sequence of the method are explained below with reference to FIGS. 4-8. These show chronologically several states during the mounting of the band-saw blade 14. Thus, FIGS. 4-8 show in sequence several states during the mounting of the band-saw blade 14 on the band-saw 12.

Figures 6, 7, 8:
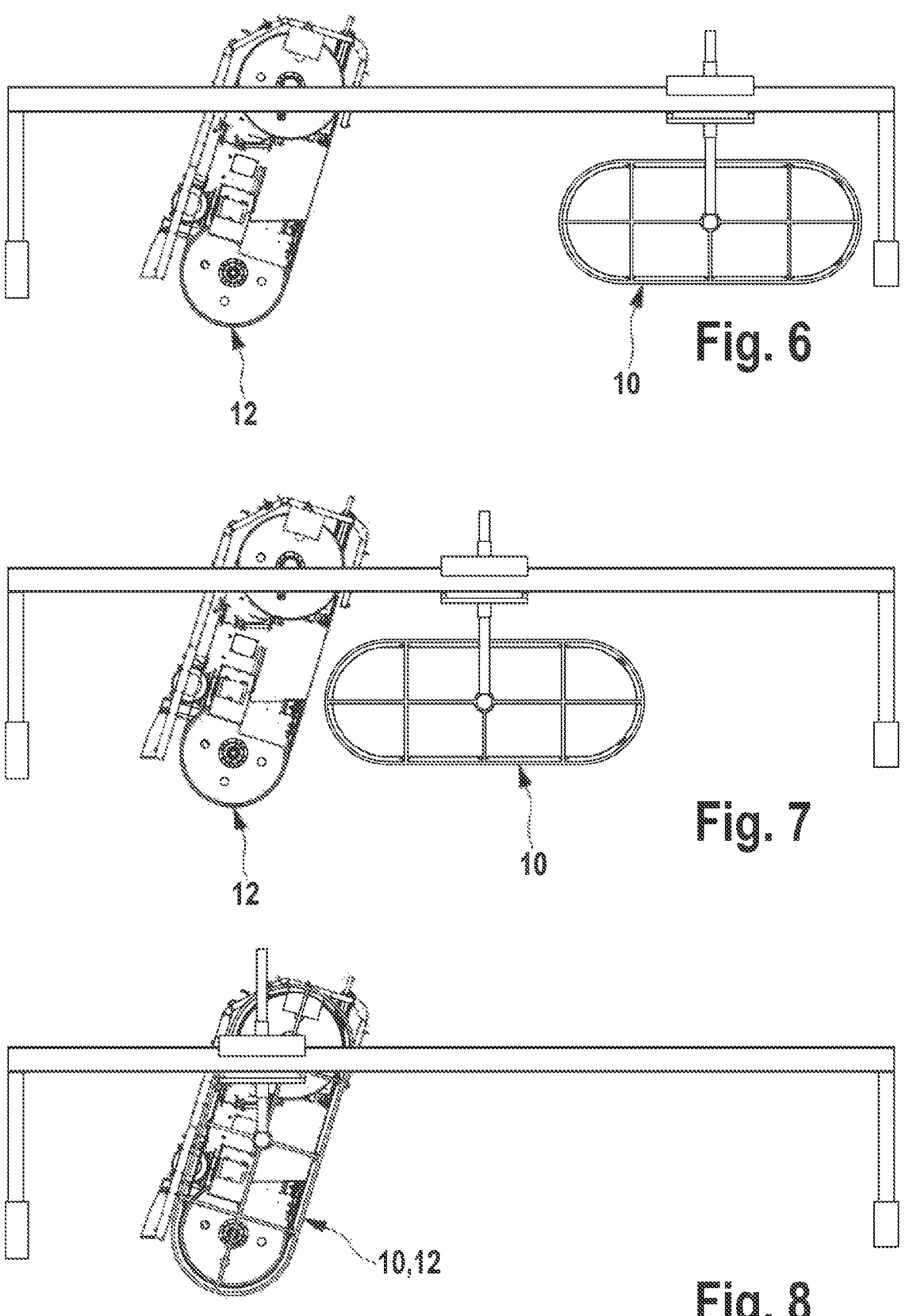
FIG. 6 a top view onto the band-saw and band-saw blade changing device of FIG. 1 in a first state.
FIG. 7 a top view onto the band-saw and band-saw blade changing device of FIG. 1 in a second state.
FIG. 8 a top view onto the band-saw and band-saw blade changing device of FIG. 1 in a third state.

FIGS. 4-6 show different views of one and the same condition in which the band-saw blade 14 to be mounted rests on a band stand 58. This band stand 58 is shown here merely by way of example as a possible way of supporting an unused band-saw blade 14.

In a first mounting step, the support frame 40 is moved towards the band-saw blade 14 arranged on the band stand 58 with the aid of the support structure 42. As soon as the support frame 40 is correctly positioned above the band-saw blade 14 with the aid of the three movable axes x, y and z, the retaining elements 52 are activated. The band-saw blade 14 thereby adheres to the retaining elements 52 and is then at least temporarily connected to the support frame 40.

Then, the support frame 40 is moved together with the band-saw blade 14 attached to it by means of the support structure 42. This condition is exemplarily shown in FIG. 7.

In the next step, the support frame 40 together with the band-saw blade 14 is pushed over the band-saw rollers 16, 16' of the band-saw 12. For this purpose, one of the two band-saw rollers 16, 16' is preferably moved in the direction of the other in order to reduce the distance between the two band-saw rollers 16, 16'. The support frame is swiveled into the angle α of the band-saw 12 with the aid of the rotatable cantilever beam and then also pushed over the band-saw rollers 16, 16' along the y-axis with the aid of the cantilever beam 50.

Once the band-saw blade 14 is correctly positioned on the band-saw rollers 16, 16', the retaining elements 52 are deactivated, causing the retaining force on the band-saw blade 14 to decrease and the band-saw blade to come to rest on the band-saw rollers 16, 16'.

The band-saw blade changing device can then move back to its starting position, which is shown in FIG. 6. By moving the two band-saw rollers 16, 16' apart, the band-saw blade 14 can then be tensioned again on the band-saw rollers and is then ready for operation.

It is understood that the dismounting operation, in which the band-saw blade 14 is removed from the band-saw 12, is performed in reverse order. First, the distance between the two band-saw rollers 16, 16' is reduced. Then the device 10 is moved towards the sawing machine 12, pivoted to angle α and pushed over the band-saw blade 14. Then the retaining elements 52 are activated and the support frame together with the band-saw blade 14 is moved away from the band-saw 12 and moved to the storage place or band stand 48, respectively. There, the retaining elements 52 are deactivated again in order to deposit or suspend the band-saw blade 14 on the band stand 58.

Removing the tension of the band-saw blade 14, i.e. the reduction of the distance between the two band-saw rollers 16, 16', can take place during the dismounting process both before and after the retaining elements 52 have been activated. If the band-saw blade 14 is only relaxed after the retaining elements 52 have been activated, this may under certain circumstances facilitate the process of the retaining elements 52 adhering to the band-saw blade 14.

The aforementioned interchangeability of the sequence of these two method steps applies equivalently to the mounting process. Here, too, it is possible to first tension the newly mounted band-saw blade 14 on the band-saw 12 and only then deactivate the retaining elements 52. Alternatively, the retaining elements 52 may be deactivated during the mounting process after the band-saw blade 14 has been mounted on the band-saw 12, but before the band-saw blade 14 is tensioned.

It is understood that FIGS. 1-8 show only one exemplary embodiment of the device 10 according to the invention. Various modifications thereto are possible without departing from the scope of the present invention as defined in the appended claims. For example, it is not necessary to move the support frame 40 by means of a support structure 42 movable along three axes. Movability along two axes may be sufficient. Also, a suspended construction of the support frame 40 or the support structure 42 is not necessarily required. The support frame 40 could just as well be movable on rollers on the floor. The support frame 40 could also be moved manually (by hand) or with the aid of a robot.

What is claimed is:

1. A device for at least one of mounting and dismounting a band-saw blade onto or from a band-saw, the band-saw blade having, when mounted on the band-saw, a closed contour and comprises two opposing narrow sides, at least one of which is provided with a plurality of saw teeth or a cutting material, and comprises two opposing flat sides interconnecting the narrow sides, one of the two opposing flat sides is an outwardly facing outer flat side and the other one is an inwardly facing inner flat side, the device comprising:

a support frame;
   a support structure configured to support and move the support frame along at least two axes aligned transversely to each other one of which at least two axes being a horizontal axis; and
   a plurality of retaining elements distributed on the support frame and configured to selectively attach to the outer flat side of the band-saw blade at various locations along the closed contour of the band-saw blade, thereby exerting an outwardly directed retaining force on the outer flat side of the band-saw blade;
   wherein the support frame is suspended from the support structure and moves with respect to the support structure about the at least two axes;
   wherein the support structure comprises a cantilever beam having a free end extendable along the horizontal axis;
   wherein the support frame is mounted on the free end; and
   wherein the support structure is configured to rotate the support frame about the horizontal axis.

2. The device of claim 1, wherein the support structure is moveable relative to the band-saw.

3. The device of claim 1, wherein the support structure comprises a guide rail and a carriage longitudinally displaceable along the guide rail.

4. The device of claim 1, wherein the retaining elements each are configured to adhere exclusively to the outer flat side of the band-saw blade.

5. The device of claim 1, wherein the retaining elements each comprise at least one of a vacuum lifter, a suction cup, a permanent magnet, an electromagnet, or a temporarily sticking retaining element.

6. The device of claim 1, wherein the support frame comprises two opposing straight sections and at least one arcuate section interconnecting the two straight sections, wherein at least one retaining element of the plurality of retaining elements is disposed in each of the two straight sections and the arcuate section.

7. The device of claim 1, wherein the support frame comprises two opposing straight sections and two opposing arcuate sections each connecting the two straight sections, wherein at least one retaining element of the plurality of retaining elements is disposed in each of the two straight sections and one of the two arcuate portions, and wherein no retaining element is disposed in the other of the two arcuate portions.

8. The device of claim 1, where the support frame is movable about three axes, which includes the two axes with respect to the support Structure and is positionable with respect to a band stand, which is configured for storing band-saw blades, in order to retain one the band-saw blade from the band stand and thereafter the support frame is movable about the three axes with respect to the support structure to the band saw for positioning the band-saw blade on the band saw.

9. A device for mounting or dismounting a band-saw blade which, when mounted on a band-saw, has a closed contour and comprises two opposing narrow sides, at least one of which is provided with a plurality of saw teeth or a cutting material, and comprises two opposing flat sides interconnecting the narrow sides, one of the two opposing flat sides being an outwardly facing outer flat side and the other one being an inwardly facing inner flat side, the device comprising:

a movable support frame; and a plurality of retaining elements distributed on the support frame and configured to temporarily adhere to the outer flat side of the band-saw blade at various locations along the closed contour of the band-saw blade, thereby exerting an outwardly directed retaining force on the outer flat side of the band-saw blade;

wherein the support frame is mounted on a free end of a cantilever beam extendable along a first axis; wherein an actuator for rotating the support frame about the first axis is provided in the cantilever beam; and wherein the cantilever beam is movable by an arm along a second axis perpendicular to the first axis.

10. The device of claim 9, wherein the retaining elements each are configured to adhere exclusively to the outer flat side of the band-saw blade.

11. The device of claim 9, wherein the retaining elements each comprise at least one of a vacuum lifter, a suction cup, a permanent magnet, an electromagnet, and/or a temporarily sticking retaining element.

12. The device of claim 9, wherein the support frame comprises two opposing straight sections and at least one arcuate section interconnecting the two straight sections, wherein at least one retaining element of the plurality of retaining elements is disposed in each of the two straight sections and the arcuate section.

13. The device of claim 9, wherein the support frame comprises two opposing straight sections and two opposing arcuate sections each connecting the two straight sections, wherein at least one retaining element of the plurality of retaining elements is disposed in each of the two straight sections and one of the two arcuate portions, and wherein no retaining element is disposed in the other of the two arcuate portions.

14. The device of claim 9, further comprising a support structure configured to support and move the support frame along the first axis and the second axis, which are aligned transversely to each other.

15. The device of claim 14, wherein the support structure is configured to move the support frame along three orthogonally aligned axes, which includes the first axis and the second axis.

16. The device of claim 14, wherein the support structure comprises the cantilever beam extendable along one of the first axis and the second axis.

17. The device of claim 14, wherein the support structure is configured to rotate the support frame about one the first axis and the second axis.

18. The device of claim 14, wherein the support frame is suspended from the support structure.

* * * * *